Patented May 18, 1954

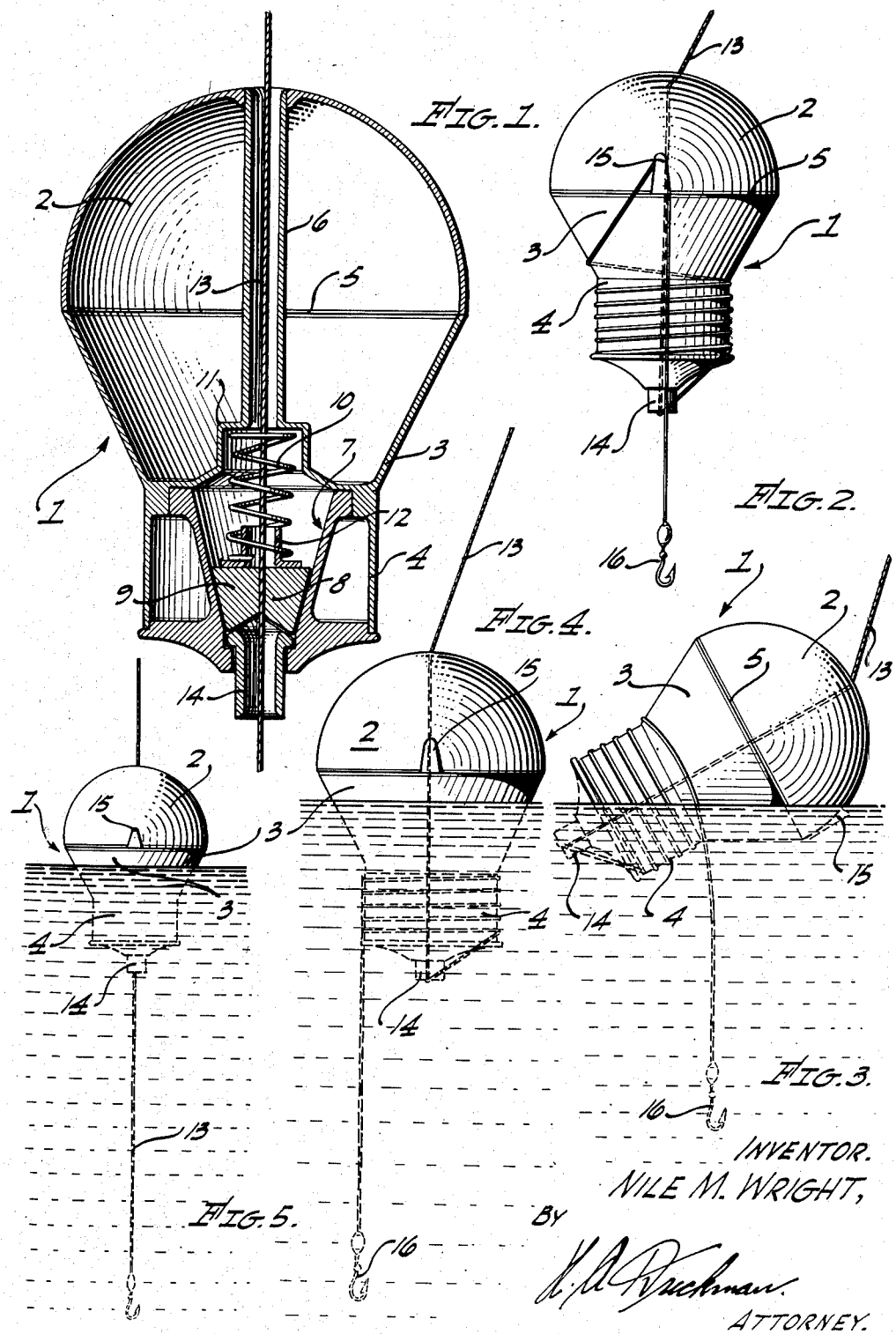

2,678,511

UNITED STATES PATENT OFFICE 2,678,511

FISHING FLOAT OR BOBBER

Nile M. Wright, Yuba City, Calif.

Application June 8, 1951, Serial No. 230,450

3 Claims. (Cl. 43—43.11)

This invention relates to a fishing float or bobber in which the line can be wrapped around the float and held in such a manner that the line is released when the float hits the water, thus permitting the hook or lure to sink below the float in any desired distance.

An object of my invention is to provide a novel fishing float in which the line is yieldably gripped by jaws within the float, thus permitting the line to be drawn through the float in one direction and to be restrained from movement in the other direction.

Another object of my invention is to provide a novel fishing float in which the float is so constructed that the line when wrapped around a portion of the float will be released when the float strikes the water, but will be retained in its wrapped position when the line is cast from the bank into the water.

Still another object of my invention is to provide a novel fishing float or bobber which is simple in construction, inexpensive to manufacture, and effective in operation.

Other objects, advantages and features of invention may appear from the accompanying drawing, the subjoined detailed description and the appended claims.

In the drawing:

Figure 1 is a longitudinal sectional view of my fishing float or bobber.

Figure 2 is a side view of my fishing float with the line wrapped thereon.

Figure 3 is a side view of the fishing float showing its position when first striking the water.

Figure 4 is a side elevation of my fishing float with the line automatically unreeling from the float.

Figure 5 is a side elevation of my fishing float with the line unreeled therefrom and depending from the float.

Referring more particularly to the drawing, my fishing float 1 consists of a hollow body, preferably formed of a light material which can be cast or molded, such as plastic, and which includes an upper hemispherical section 2 and a lower section 3, which includes an integral cylindrical part 4 upon which the fish line is wrapped, as will be further described.

The upper portion of the part 3 is cone-shaped and fits the bottom of the upper part 2 along the line 5, and the two parts are glued, welded, soldered, etc., along this line to form the completed external wall of the bobber or float. A tube 6 rises from the lower part 3 and extends through the top of the upper portion 2, substantially as shown in Figure 1, and, furthermore, the tube 6 is also glued, welded, soldered, etc., to the wall of the part 2 so as to seal the joint at this point.

A conical seat 7 is formed in the lower part 3 in axial alignment with the float, substantially as shown, and this seat is also an integral part of the lower part 3 and preferably forms the inner wall of the cylinder portion 4. The seat 7 is termed an integral part of the lower part 3 for the following reason: My float is preferably formed from a plastic material. The seat 7 is separately molded, then placed in the part 3 and held in place with a cement, after which the parts are substantially integral.

A pair of wedge blocks 8 and 9 are seated on the cone 7 and these wedge blocks are pressed downwardly into the seat 7 by the spring 10. The upper end of the spring 10 acts against a shoulder 11 at the lower end of the tube 6, and also the lower end of the spring encircles a sleeve 12 which rests on top of the wedge blocks 8 and 9. The fishing line 13 extends through the tube 6 and between the wedge blocks 8 and 9, and thence outwardly through the bottom of the float 1. The wedge blocks 8 and 9 thus normally grip the line 13 under tension of the spring 10 and thus prevent the fishing line from moving downwardly through the float or bobber 1.

A sleeve 14 projects from the bottom of the float 1, substantially as shown, and bears against the bottom of the wedge blocks 8 and 9. Thus, by manually pushing the sleeve 14 upwardly, the wedge blocks 8 and 9 will be moved upwardly and outwardly, thus releasing their grip on the line 13 and enabling the line to be adjusted within the float 1, as desired by the user.

A hook or ear 15 is cast or formed on the outside of the float 1 and preferably immediately above the joint line 5. The end of the line adjacent the hook 16 can be draped over this hook or lug during the casting operation of the line, as will be hereinafter described.

In operation, the sleeve 14 is manually pushed upwardly, thus spreading the wedge blocks 8 and 9 and enabling the fisherman to drop the line 13 through the tube 6 and thence between the wedges, and then through the sleeve 14 and out through the bottom of the float. The line is then pulled through the float the required distance and thereafter the sleeve 14 is released, whereupon the wedges 8 and 9 will be pressed downwardly by the spring 10 and inwardly by the seat 7 to grip the line 13 and prevent further movement of the line downwardly through the float 1.

The required weight, hook and lure is now attached to the end of the line 13 in the usual manner. When it is desired to cast the line into the water, the lower part of the line 13 below the float is first wrapped on to the cylinder 4, as shown in Figure 2. Thereafter the line is looped or hooked around the lug or shallow hook 15, as shown in Figure 2, permitting the weight and the hook 16 to dangle somewhat below the bottom of the float 1.

When the float strikes the water, the position shown in Figure 3 is assumed, that is, the weight of the hook, lure and sinker is sufficient to tilt the float in the water, thus placing the lug 15 at the angle shown and permitting the end of the fishing line 13 to drop off of this lug or hook. As shown as this occurs, the float assumes an upright position, as shown at Figure 4. The line 13 is now vertical in the water due to the weight of the sinker or lure, and this weight is enough unreel the line from the cylinder 4 until the entire length of line below the float is unreeled. The final or fishing position is shown in Figure 5, with a sufficient length of line below the float 1 so that the hook or lure is adjacent the bottom of the pond. If it is desired to shorten the line below the float 1, it is only necessary to pull upwardly on the line 13 which causes the wedge blocks 8 and 9 to slide upwardly and outwardly and release the line. To increase the length of line below the float 1, it is again necessary to manually push the sleeve 14 upwardly, as previously described.

Having described my invention, I claim:

1. A fishing float comprising a hollow body having a cylindrical section on the lower end thereof, a conical seat in said cylindrical section co-axial with the longitudinal axis of said body, a pair of wedge blocks resting on said seat, and a tube extending from above said conical seat and through the top of said body, said tube being co-axial with said body, spring means bearing against said wedge blocks and pressing said wedge blocks downwardly against said seat, and a sleeve slidably mounted in the lower end of said body and projecting from the body and engaging the bottom of said wedge blocks.

2. A fishing float comprising a hollow body, said body comprising an upper hemispherical section, a lower section attached to the upper hemispherical section and having a cylindrical lower end, a tapered seat within the lower section and co-axial with said body, a pair of wedge blocks resting on said seat and a tube extending from above said seat through the top of the upper section, said tube being co-axial with the longitudinal axis of the body, spring means bearing against said wedge blocks and pressing the wedge blocks downwardly in the seat and a sleeve projecting from the bottom of said lower section and slidably mounted therein, said sleeve engaging the bottom of said wedge blocks.

3. A fishing float comprising a hollow body, said body consisting of an upper hemispherical section, a lower cylindrical section, an outwardly tapered wall connecting the lower cylindrical section and the upper hemispherical section, said sections and wall being joined, a conical seat within said cylindrical section and co-axial with the longitudinal axis of said body, a pair of wedge blocks resting on said seat, a tube extending from above said conical seat and through the top of said body, said tube being fixedly attached at its upper end to the hemispherical section and at its lower end to the seat, said tube being co-axial with said body, spring means bearing against said wedge blocks and pressing said wedge blocks downwardly against said seat and a sleeve slidably mounted in the cylindrical section, one end of the sleeve projecting from the end of the body and the other end of the sleeve engaging the bottom of said wedge blocks.

References Cited in the file of this patent

UNITED STATES PATENTS

| Number | Name | Date |
|---|---|---|
| 250,848 | Smith | Dec. 13, 1881 |
| 581,136 | Preece | Apr. 20, 1897 |
| 717,237 | Marsters | Dec. 30, 1902 |
| 2,166,457 | Berndt | July 18, 1939 |
| 2,226,331 | Allison | Dec. 24, 1940 |
| 2,376,958 | Chapman | May 29, 1945 |
| 2,413,371 | Parker | Dec. 31, 1946 |
| 2,529,179 | Oberholtzer | Nov. 7, 1950 |

FOREIGN PATENTS

| Number | Country | Date |
|---|---|---|
| 17,456 | Great Britain | 1908 |